(12) United States Patent
Chuah et al.

(10) Patent No.: US 9,569,112 B1
(45) Date of Patent: Feb. 14, 2017

(54) DRIVE COMPATIBILITY INFORMATION MAINTENANCE

(71) Applicant: Western Digital Technologies, Inc., Irvine, CA (US)

(72) Inventors: Boon Hooi Chuah, Irvine, CA (US); Anthony B. Andrews, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 132 days.

(21) Appl. No.: 14/497,272

(22) Filed: Sep. 25, 2014

(51) Int. Cl.
*G06F 3/06* (2006.01)

(52) U.S. Cl.
CPC ............. *G06F 3/0607* (2013.01); *G06F 3/067* (2013.01); *G06F 3/0661* (2013.01); *G06F 3/0679* (2013.01); *G06F 2206/1014* (2013.01); *G06F 2212/1004* (2013.01)

(58) Field of Classification Search
None
See application file for complete search history.

(56) References Cited

U.S. PATENT DOCUMENTS

| | | | |
|---|---|---|---|
| 6,499,054 B1 | 12/2002 | Hesselink et al. | |
| 6,732,158 B1 | 5/2004 | Hesselink et al. | |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 7,949,564 B1 * | 5/2011 | Hughes .............. | G06Q 30/0251 705/14.49 |
| 8,004,791 B2 | 8/2011 | Szeremeta et al. | |
| 8,255,661 B2 | 8/2012 | Karr et al. | |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |

(Continued)

*Primary Examiner* — Brian Peugh
*Assistant Examiner* — Tracy Chan
(74) *Attorney, Agent, or Firm* — Chang & Hale LLP

(57) ABSTRACT

Systems and methods are disclosed for managing data storage drive compatibility information in a network-attached storage device (NAS). The NAS includes a data storage drive connection interface, a non-volatile memory module storing local drive compatibility information, and a controller configured to detect a connection of a data storage drive to the NAS over the connection interface. The controller is further configured to obtain updated drive compatibility information from a server over a network and determine whether the data storage drive is compatible with the NAS based at least in part on the updated drive compatibility information. When the data storage drive is compatible with the NAS, user data may be stored in the data storage drive using the connection interface.

25 Claims, 5 Drawing Sheets

(56) References Cited

U.S. PATENT DOCUMENTS

| | | | |
|---|---|---|---|
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 8,856,293 B1* | 10/2014 | Sadry | G06F 3/067 709/211 |
| 2005/0144195 A1 | 6/2005 | Hesselink et al. | |
| 2005/0144200 A1 | 6/2005 | Hesselink et al. | |
| 2005/0185597 A1* | 8/2005 | Le | H04L 41/0866 370/254 |
| 2008/0301201 A1* | 12/2008 | Sugimoto | G06F 11/1458 |
| 2009/0164608 A1* | 6/2009 | Komaki | G06F 3/0605 709/220 |
| 2010/0100966 A1 | 4/2010 | Hamid | |
| 2012/0036041 A1 | 2/2012 | Hesselink | |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0095439 A1 | 4/2014 | Ram | |
| 2014/0169921 A1 | 6/2014 | Carey | |
| 2014/0173215 A1 | 6/2014 | Lin et al. | |
| 2014/0317264 A1* | 10/2014 | Parekh | H04L 41/0853 709/224 |
| 2015/0186172 A1* | 7/2015 | Thomas | G06F 9/45533 718/1 |
| 2015/0373546 A1* | 12/2015 | Haugen | H04W 12/08 726/22 |
| 2016/0004693 A1* | 1/2016 | Chen | G06F 17/302 707/825 |
| 2016/0080489 A1* | 3/2016 | Ngo | H04L 67/1095 709/219 |

* cited by examiner

DRIVE COMPATIBILITY INFORMATION MAINTENANCE

BACKGROUND

Data storage devices configured to be connected to various data storage drives may or may not be compatible with particular types of drives. Tracking of information indicating drive compatibility can be useful in data storage management.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
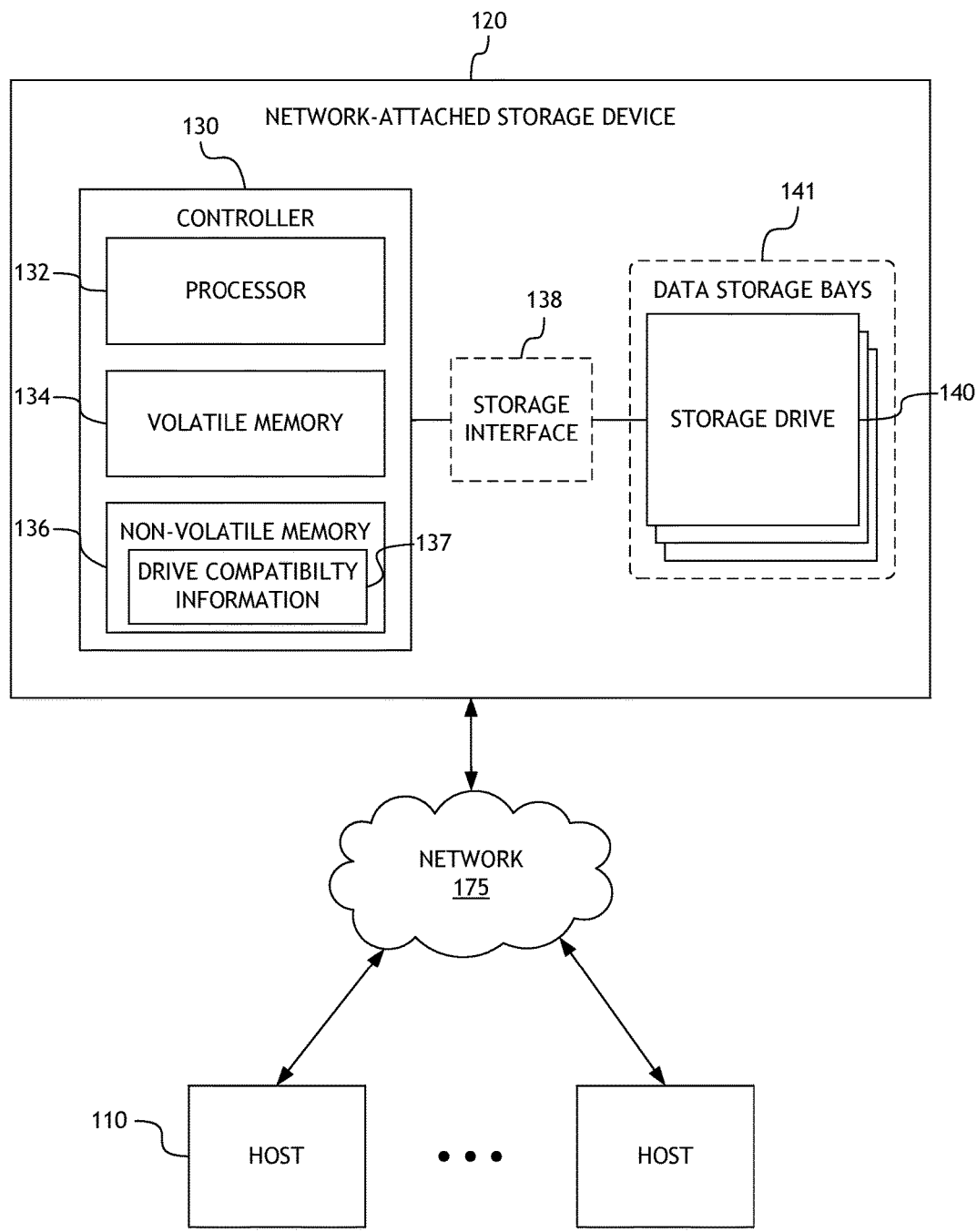
FIG. 1 is a block diagram representing a data storage system according to an embodiment.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to controller board layouts in data storage systems.

Overview

Network-attached storage (NAS) devices may be configured to be connected to one or more data storage drives configured to provide mass storage for the NAS. For example, a NAS device may include an enclosure containing control circuitry and one or more storage bays for receiving data storage drives. However, certain data storage drives may not be compatible with various NAS devices, such that when such a storage drive is connected to the NAS, the storage capacity of the storage drive may not be utilized by the NAS for storing user data. A storage drive may be incompatible with a NAS device for any number of reasons, such as lack of support for relevant file-sharing and/or security protocols, or the like.

In order for a NAS device to identify whether a given storage drive is compatible with the NAS, certain systems/devices provide for maintenance of drive compatibility information by the NAS, wherein the drive compatibility information provides an indication of the compatibility, or incompatibility, of one or more data storage drives vis-à-vis the NAS. For example, a NAS may maintain a storage drive "blacklist," which may specify one or more drives that cannot be used in the NAS. Although certain embodiments are disclosed herein in the context of drive blacklists, it should be understood that drive compatibility information as disclosed herein may comprise a drive whitelist, which may specify one or more storage drives that can be used in a particular NAS, or combination of black and whitelists, or other type of information indicating compatibility between data storage drives and NAS devices. The use of drive compatibility information can provide for reduced support costs by ensuring that only drives that have been tested and confirmed to operate properly in the NAS are designated as acceptable for use by the NAS. If a particular drive is not compatible, a NAS device may be configured to inform the user that the drive is not supported. Drive compatibility information, in certain embodiments, may be hard-coded in device firmware.

Certain embodiments disclosed herein provide for utilization by a NAS device of dynamic drive compatibility information (e.g., blacklist and/or white list) stored on a remote server to determine which drives are unacceptable/acceptable to be used in the NAS. By using dynamic drive compatibility information, rather than hard-coded drive compatibility information in device firmware, the drive compatibility information may be relatively easily updated at a single source, without the need to update the firmware.

Data Storage System

Network-attached storage (NAS) drives/systems can provide file-level data storage over a computer network, wherein access to the stored data is accessible to one or more clients. For example, a NAS may include hardware, software, or a combination of such elements, configured such that the NAS operates as a file server. NAS devices/systems can provide a convenient mechanism for remotely accessing user data. FIG. 1 is a diagram of a data storage system including a NAS device 120 according to an embodiment.

The NAS 120 may comprise a housing or enclosure made of, for example, metal and/or plastic, wherein periods components and/or devices are disposed within the housing. Furthermore, as shown in FIG. 1, the NAS 120 may comprise one or more controller boards 130 and one or more storage drives 140. The controller board 130 of the NAS 120 may comprise a processor 132 (e.g., central processing unit (CPU)). The processor 132 may be coupled to a storage interface 138, such as a Serial ATA (SATA), Serial attached SCSI (SAS), Peripheral Component Interconnect (PCI), PCI Express (PCIe), or other type of storage interface. The storage interface 138 may be configured, according to one embodiment, as an extensible drive interface configured to implement a serial addressing scheme to access the storage drive(s) 140. The storage interface 138 may be configured to deliver power signals and/or storage protocol signals from the controller 130, such as signals provided by an on-board bus-specific controller. The storage interface 138 may provide a connection interface between the controller 130 and the storage drive(s). In certain embodiments, the connection interface between the storage drive(s) and the NAS 120 may allow for hot-swapping of removable storage drives.

The controller 130 may further comprise a volatile memory module 134, which may provide main memory for the NAS 120. For example, the memory 134 may be configured to store data and instructions for executing programs/processes by the processor 132. The volatile memory 134 may further provide system cache, wherein the memory is used at least in part for relatively fast data storage access to relatively important and/or recently-used data and instructions, wherein certain user data stored on the storage drive(s) 140 is copied to, and temporarily maintained in the volatile memory 134. The memory may be any suitable size, such as 256 GB, 2 GB, 4 GB, 8 GB, or more. In certain embodiments, the volatile memory 134 comprises solid-state memory. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips.

The NAS 120 may include one or more power sources (not shown), which may be managed by a power controller (not shown). The architecture of FIG. 1 may be extended to accommodate different numbers and/or configurations of storage drives. Furthermore, the storage server 120 may include any number of rack unit storage bays 141 for receiving the storage drives 140, such as 2, 4, 8, or more bays. As an example, one or more storage bays 141 may provide a standard-sized area for adding data storage hardware drive(s) to the NAS system 120. The data storage bay(s) 141 may be substantially fixed to an inside casing of the NAS 120, or may be removable. The data storage bay(s) may have any desirable form factor. For example, the data storage bay(s) may have one of the following form factors: 5.25", 3.5", 2.5", 1.8", or other dimensions. As referenced above, the data storage bay(s) 141 may be configured to receive data storage drives, such as disk drives, or may be used for otherwise connecting one or more storage drives through front-end USB ports, I/O bays, card readers, fans, fan controllers, RAID controllers, tool storage, and/or the like. Furthermore, the NAS 120 may be configured to utilize multiple storage bays and/or storage drives for providing RAID functionality for the NAS.

The data storage bay(s) 141 may be configured to allow for the storage drive(s) 140 to be secured with hardware/fastener(s) to hold the drive(s) in the NAS 120. As described above, the data storage bay(s) 141 and/or storage drive(s) 140 may be coupled to a storage interface 138 for data and/or power communications with the controller 130. The data storage bay(s) 141 may be coupled to the storage interface 138 using any suitable interface connector, such as a standard SAS connector. In certain embodiments, the storage interface 138 comprises one or more SAS busses, PCIe busses, Serializer/Deserializer (SerDes) busses, USB busses, or other communication interface for coupling the storage drive(s) 140 to the controller 130. Such buss(es) may be used for data/power communications between one or more of the components of the controller 130 and the storage drive(s) 140 mounted in the storage drive bays (104a, 104b). The storage interface 138 may provide SerDes functionality, which may convert data passing between the storage drive(s) 140 and the controller 130 between serial data and parallel interfaces in one or more directions The NAS further includes a non-volatile memory module 136, which may store drive compatibility information 137, such as a storage drive blacklist and/or whitelist indicating compatibility between the NAS 120 and one or more data storage drives, such as the storage drive(s) 140 shown. The non-volatile memory 136 may comprise device firmware. The drive compatibility information may be used by the control to determine whether connected drive(s) 140 are compatible with the NAS 120. The data storage bay(s) 141 may provide for connection of the storage drive(s) 140 via, for example, a USB port, a SAS connector, a PCIe slot, a PCI slot, or other or other connector for mounting a device to the hard drive bay as known by those having skill in the art. When a storage drive 140 is connected to a storage bay 141, the controller may be configured to detect such connector and determine whether the storage drive is compatible with the NAS device. For example, the controller may make such determination may referencing the locally-stored drive compatibility list (e.g., blacklist), to determine if the specific drive is identified as being compatible or incompatible with the NAS 120. In certain embodiments, the absence of information associated with the specific drive may provide an indication as to the compatibility of the drive with the NAS 120.

The NAS 120 may be configured to connect to one or more host systems/devices over a network 175. As shown, one or more client devices or systems 110 that may be configured to access the storage server 120 over, for example, a local area network (LAN) or a wide area network (WAN), such as the Internet. The NAS 120 may provide data storage services to the hosts 110 over the network.

Dynamic Updating of Drive Compatibility Information

Figure 2:
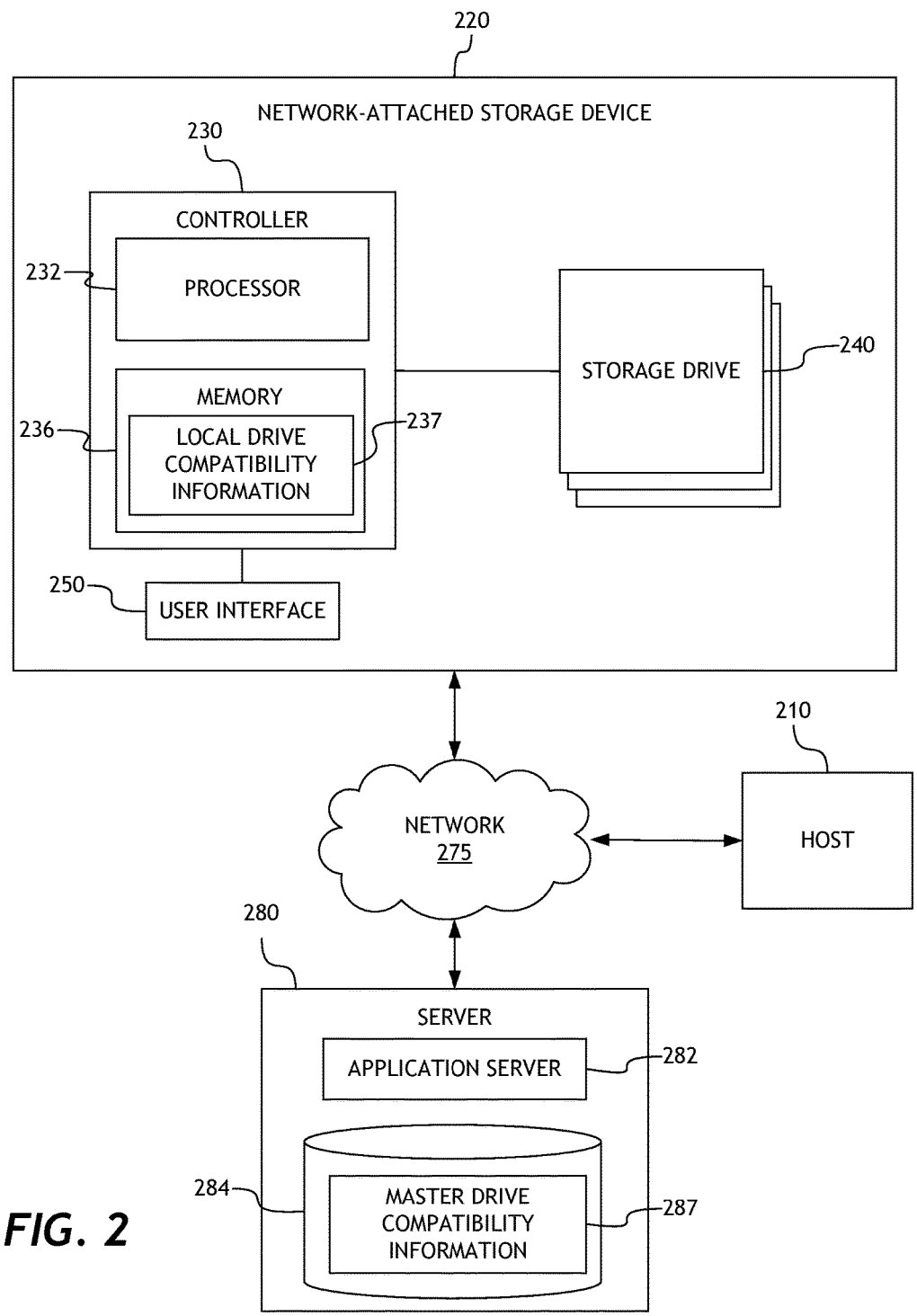
FIG. 2 is a block diagram representing a data storage system according to an embodiment.

FIG. 2 illustrates an embodiment of a system for managing drive compatibility information. The system of FIG. 2 includes a server 280, which may be connected to one or more remote NAS devices (e.g., NAS 220) over a network 275, such as the Internet. The server 280 illustrated in FIG. 2 represents a logical association of one or more computing devices associated with a drive compatibility information management service provider. Specifically, the server 280 can include a web-based application server 282 component corresponding to one or more server computing devices for obtaining and processing requests for drive compatibility information from client devices (e.g., NAS 220). In certain embodiments, a user may access the server 280 over a wide area network (WAN), such as the Internet, and receive drive compatibility information from the server 280 upon request.

The server 280 may comprise a data store 284 storing drive compatibility information 287. The data store 284 may comprise any number or configuration of data storage modules or devices, and may be accessible via an application server 282. The application server 282 may be configured to receive requests from devices over the network 275 for drive compatibility information, and may service such requests at least in part by accessing the drive compatibility information 287 on the data store 284 and providing at least a portion of such data in response to requests.

The NAS 220 includes a controller 230 including a processor 232 and one or more memory modules 236. The memory 236 may be configured to store local drive compatibility information 237, which, as described above, may include information indicating the compatibility of the NAS 220 with one or more storage drives, such as storage drive(s) 240 connected to the NAS 220. Although certain embodiments disclosed herein provide for retrieval of drive compatibility from a remote server (e.g., server 280), the NAS 220 may also store the local drive compatibility information 237 in the memory 236 in order to enable the NAS 220 to determine drive compatibility when the NAS 220 is not connected to the server 280.

The drive compatibility information 287 may be considered a master instance of drive compatibility information for the system of FIG. 2. That is, while the NAS 220 devices may store local drive compatibility information, as described above, the drive compatibility information 287 stored at the server 280 may represent a most up-to-date version of the relevant compatibility information for the NAS 220. In order to maintain the master drive compatibility information as up-to-date, the server may periodically or sporadically update the compatibility information 287 to reflect changes or modifications in compatibility relationships between various NAS devices (e.g., NAS 220) and various data storage drives. For example, when a new drive is introduced to the market, or a drive is tested that had previously not been tested for compatibility purposes, the server 280 may obtain information indicating the compatibility of the drive with the NAS 220 and revise the compatibility information 287 to reflect such compatibility, or lack thereof.

The local drive compatibility information 237 and/or master drive compatibility information 287 may be contained in any type of data structure and/or structures. For example, in certain embodiments, drive compatibility information may comprise one or more XML files or other data types. An XML file associated with drive compatibility information may include a plurality of fields and/or data parameters identifying NAS devices and/or data storage drives by, for example, part number, model number, or other type of drive and/or device identification information. Furthermore, drive compatibility information may identify a version number or other identifier indicating the particular version or iteration of the drive compatibility information currently stored. For example, in an embodiment the memory 236 includes metadata identifying a version of the local drive compatibility information 237.

In connection with device startup, or with the detection of connection of a storage drive 240 to the NAS 220, the NAS 220 may transmit a request to the server 280 over the network 275, wherein the request includes information identifying the version of the drive compatibility information 237 currently stored in the memory 236. The server 280 may further be configured to receive the request and identify the version identification information contained in the request and may determine, based on said information, whether the local drive compatibility information 237 in the possession of the NAS 220 is a current version of the drive compatibility information. In the event that the version of the local drive compatibility information 237 is not a most up-to-date version of traffic bad will the information, the server may access the master drive compatibility information 287 and provide at least a portion thereof, possibly including updated compatibility information version number or identification information, to the NAS 220 over the network 275. In response, the NAS 220 may update its local drive compatibility information 237 to reflect the up-to-date version/information provided by the server 280. In certain embodiments, the server provides only changes or other information indicating differences between the out of date compatibility information and the updated compatibility information, while in an alternative embodiment, the server 280 provides a substantially complete copy of the up-to-date drive compatibility information stored in the data store 284.

As described above, the local drive compatibility information 237 and/or master drive compatibility information 287 may comprise a table including one or more entries identifying one or more drives as being either compatible or incompatible with a NAS or plurality of NAS devices. Such a table may be either a blacklist or white list. In an embodiment comprising a drive compatibility blacklist, a drive compatibility table may include a listing of drives that are incompatible with the particular NAS, or plurality of NAS devices. Table A, produced below, provides an example of a blacklist including a first row including drive identification information identifying a first drive determined to be incompatible with a NAS device associated with the table.

TABLE A

| Drive Family | Capacity | Part Number |
| --- | --- | --- |
| DriveFam1 | 1 TB | XXXXXXXXX |
| Future addition | TBA | TBA |

A drive compatibility table, such as table A, may further include additional information, such as drive capacity, drive family, or other drive identification data, such as market release date and/or other data. The server 280 of FIG. 2 may utilize a table having similarities with Table A for storage of the master drive compatibility information 287 in the data store 284. As shown in Table A, a drive blacklist or whitelist may be configurable for the addition of future additions to the whitelist or blacklist, such that the drive compatibility information may be dynamically updatable. Dynamic updating of compatibility information at the server 280 may advantageously allow for a NAS device 220 to have access to up-to-date drive compatibility information without requiring updates to device firmware. The flexibility of dynamically updating drive compatibility information without the need to update NAS firmware for each update can provide substantial benefit with respect to user experience and/or autonomy.

The system of FIG. 2 may include one or more host devices 210 connected to one or more NAS devices (e.g., NAS 220) and/or the server 280, either directly or over the network 275. In certain embodiments, the NAS 220 may provide data storage access and/or backup services to the host 210 over the network 275. In certain embodiments, the NAS 220 further includes one or more user interface components 250, such as a display screen, light (e.g., LED), speaker, or the like, for communicating drive compatibility information to a user. For example, the NAS 220 may be configured to provide a user notification using the user interface 250 when it is determined that a drive of the storage drives 240 is in compatible with the NAS.

Figure 3:
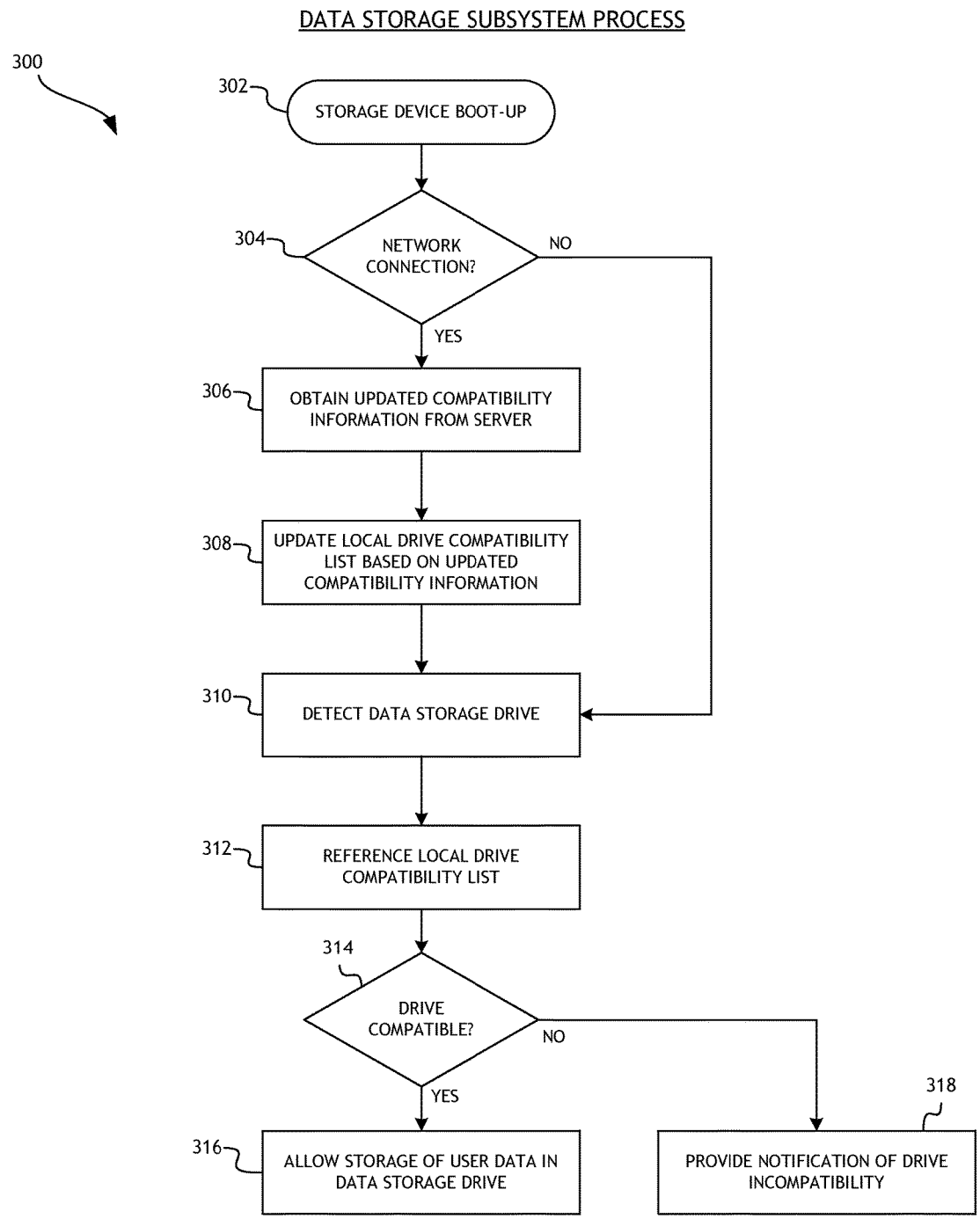
FIG. 3 is a flow diagram illustrating a process for managing data storage drive compatibility information according to an embodiment.

Check if there is a new HDD blacklist version available during system boot up or on a specific time daily Drive Compatibility Information Management Processes FIG. 3 illustrates a process 300 for managing drive compatibility information in a NAS device. The process involves powering up or booting up a data storage device, such as a network-attached storage drive (NAS) at block 302. At block 304, the process 300 involves determining whether a network connection exists between the NAS device and a remote drive compatibility server. For example, such a network connection may be over the Internet, or other WAN. If a network connection exists, at block 306, the process 300 involves obtaining updated compatibility information from the remote server. In certain embodiments, updated compatibility information is only obtained from the server in the event that the server is storing drive compatibility information that is more up-to-date than a current version of drive compatibility information stored locally on the NAS. Updating of drive compatibility information may be performed by the NAS according to any desirable timing scheme. For example, updating may be performed in response to system power-up, storage drive detection, or other event, or may be performed at designated periodic times, such as at a particular time daily, hourly, or according to another time interval.

At block 308, the process 300 involves updating local drive compatibility information stored on the NAS based on updated compatibility information received over the network from the remote server. In certain embodiments, such updating, as described in block 308, may be performed only when it is determined that the locally stored drive compatibility information on the NAS device is out-of-date. Having updated locally stored drive compatibility information, the NAS device may be configured to make drive compatibility determinations based on such updated compatibility information. For example, as shown at block 310, the NAS device may detect the connection of a data storage drive to the NAS. For example, as discussed above, when a data storage drive is inserted into a bay of a NAS device (e.g., by a user) and thereby connected with a connection interface of the NAS device, the NAS may detect such connection, and may obtain information associated with the drive, wherein such information may be used by the NAS to determine compatibility of the drive. Furthermore, when no network connection is detected at block 304, the process 300 may proceed to block 310 without obtaining updated compatibility information from the server or updating the local drive compatibility in formation at blocks 306 and 308, respectively.

At block 312 the NAS references a locally saved drive compatibility list, such as a drive blacklist or whitelist. In certain embodiments, the NAS may use drive and/or NAS identification information (e.g., part number, etc.) to look up whether the connected drive is compatible with the NAS. If the drive is not compatible with the NAS, the process 300 proceeds to block 318 where the NAS may provide a notification of drive incompatibility, such as an error message or the like. For example, such notification may be provided via user notification utilizing a user output component of the NAS, such that display screen, audio device, or one or more lights or other visual identification mechanisms. In certain embodiments, the NAS may display a message to a user providing details of device incompatibility, or a description of the incompatibility. For example, the notification may identify a bay in which the incompatible drive is disposed, such as by bay number.

In the event that it is determined at block 314 that the drive is compatible with the NAS, the process 300 may further involve accepting the data storage drive and allowing use of the data storage drive by the NAS, wherein user data and or the like may be stored and/or accessed between the NAS and the data storage drive, as described in block 316. In certain embodiments, at least one or more of the illustrated steps of the process 300 may be performed by a processor of the NAS device.

Figure 4:
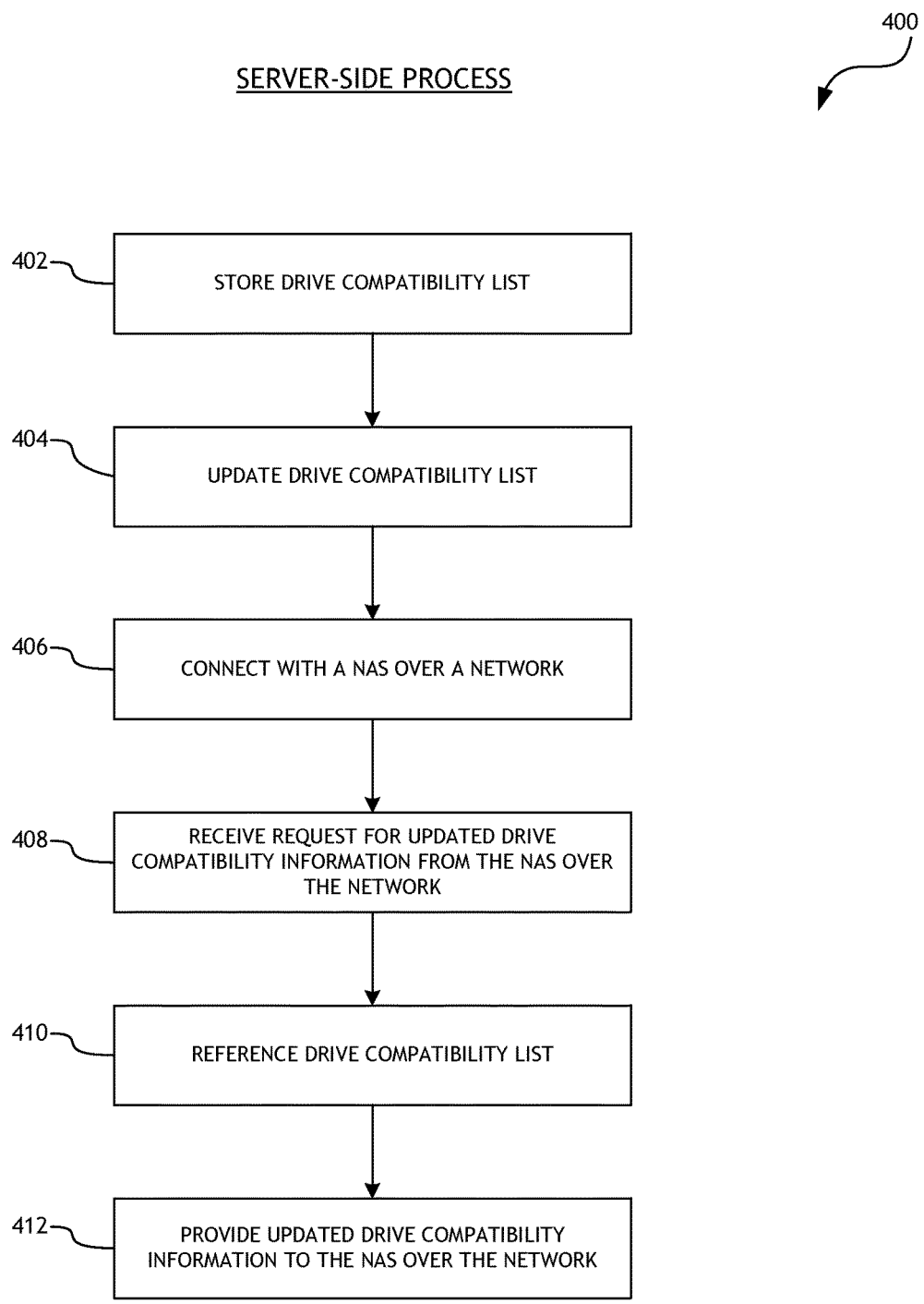
FIG. 4 is a flow diagram illustrating a process for managing data storage drive compatibility information according to an embodiment.

FIG. 4 is a flow diagram illustrating a process 400 for managing data storage drive compatibility information according to an embodiment. At block 402, the process 400 involves storing, at a remotely-accessible server, drive compatibility information, such as a data storage drive blacklist, or whitelist.

At block 404, the process 400 involves the server system updating the drive compatibility information to reflect new or revised drives and/or compatibility conditions. Such updating may be performed periodically, sporadically, or according to a certain schedule or update timing mechanism. For example, when a new drive and/or NAS device is introduced to the market, or when updates to a drive and/or NAS device reflect a modified compatibility relationship between the drive and NAS, the server may modify the stored drive compatibility information to incorporate the updated compatibility relationship.

At block 404, the process 400 involves connecting with a NAS device over a network, such as the Internet. Once a connection is established, the server may receive a request from the NAS over the network for updated drive compatibility information at block 408. In response to the request, the server may access the drive compatibility information stored at the server (block 410) and provide at least some of the stored compatibility information to the NAS over the network at block 412. The updated drive compatibility information may be used by the NAS to determine if one or more storage drives connected thereto are compatible with the NAS.

Figure 5:
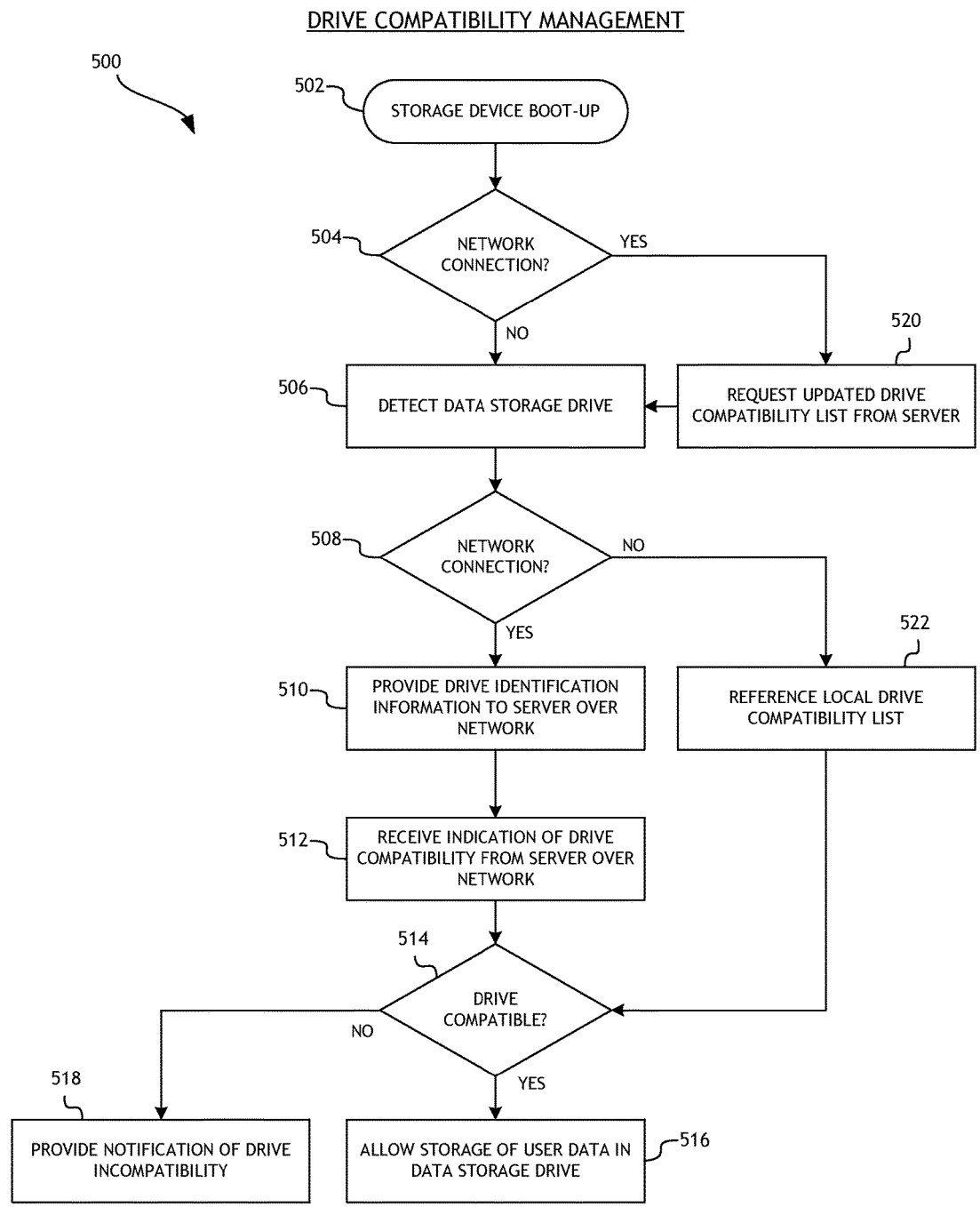
FIG. 5 is a flow diagram illustrating a process for managing data storage drive compatibility information according to an embodiment.

FIG. 5 is a flow diagram of a process 500 for managing drive compatibility information according to one or more embodiments of the present disclosure. At block 502, a NAS device is booted up. The process 500 proceeds to decision block 504 where it is determined whether a network connection exists between the NAS and a remote server over a network, such as the Internet. If a connection has been established, the process 500 proceeds to block 520 where a request for updated drive compatibility information is submitted to a remote server. In response to the request for updated drive compatibility information, the NAS may receive the requested updated drive compatibility information from the remote server and may update locally-stored drive compatibility information to reflect any updates or changes associated with the information received from the server. If it is determined at the decision block 504 that no network connection is present, the process 500 proceeds to block 506, where the NAS detects connection of a data storage drive thereto.

At block 508 of the process 500, it is once again determined whether network connection exists. If no network connection exists, then the NAS may be unable to rely on a server connection in determining whether the detected storage drive is compatible with the NAS. Therefore, the process may proceed to block 522 where locally saved drive compatibility information is referenced by the NAS to determine whether the connected data storage drive is compatible with the NAS. If a network connection exists, the process 500 proceeds to block 510 where the NAS may provide drive identification information associated with the detected data storage drive over the network to a remote server. For example, the transmission to the server may contain a drive ID number or other identifying metadata.

At block 512, the NAS receives a response to the provided information from the server, wherein the response may include an indication of drive compatibility. For example, the received indication may indicate to the NAS whether the detected data storage drive that is connected to the NAS is compatible with the NAS. At block 514, it is determined whether, based on the response from the remote server, the drive is compatible with the NAS if so, the process 500 may involve allowing storage of user data in the connected data storage drive. However, if it is determined that the drive is incompatible with the NAS, the process 500 may proceed to block 518 where the NAS provides a notification of drive incompatibility. For example, such notification may be made via a display screen, audio device, or other notification instrument of the NAS.

Additional Embodiments

Those skilled in the art will appreciate that in some embodiments, other types of storage drive compatibility information management systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A network-attached storage device (NAS) comprising:
   a data storage drive connection interface;
   a non-volatile memory module storing local drive compatibility information that indicates whether data storage drives are compatible with the NAS; and
   a controller configured to:
      detect a connection of a data storage drive to the NAS over the connection interface, and
      in response to said detection:
         obtain updated drive compatibility information from a remote server over a network,
         determine whether the data storage drive is compatible with the NAS based at least in part on the updated drive compatibility information, and
         when the data storage drive is compatible with the NAS, send user data to the data storage drive using the connection interface, wherein the data storage drive receives and stores the sent user data.

2. The NAS of claim 1, wherein the controller is further configured to determine whether the NAS is connected to the network in response to said detecting the connection prior to obtaining the updated drive compatibility information.

3. The NAS of claim 1, wherein the controller is further configured to:
   send a request for the updated drive compatibility information to the remote server over the network; and
   update the local drive compatibility information based at least in part on the updated drive compatibility information.

4. The NAS of claim 3, wherein the request for the updated drive compatibility information includes version identification information associated with the local drive compatibility information.

5. The NAS of claim 3, wherein the controller is further configured to send the request for the updated drive compatibility information in connection with boot-up of the NAS.

6. The NAS of claim 3, wherein the controller is further configured to send the request for the updated drive compatibility information at periodic intervals.

7. The NAS of claim 3, wherein the controller is further configured to send the request for the updated drive compatibility information in response to detecting the connection of the data storage drive to the NAS.

8. The NAS of claim 3, wherein the controller is further configured to provide a user notification indicating that the data storage drive is not compatible with the NAS when the updated local drive compatibility information indicates that the data storage drive is not compatible with the NAS.

9. The NAS of claim 8, wherein the controller is further configured to provide the user notification using a display component of the NAS.

10. The NAS of claim 1, wherein the controller is further configured to:
    determine that the NAS is not connected to the network; and
    in response to said determination, determine whether the data storage drive is compatible with the NAS based at least in part on the local drive compatibility information.

11. The NAS of claim 1, wherein the local drive compatibility information comprises a drive blacklist.

12. The NAS of claim 1, wherein the local drive compatibility information comprises a drive whitelist.

13. The NAS of claim 1, wherein the controller is further configured to prevent user data from being sent to the data storage drive when the controller determines that the data storage drive is not compatible with the NAS.

14. A computing system comprising:
    one or more data storage devices storing drive compatibility information indicating compatibility between data storage drives and network-attached storage devices; and
    an application server configured to:
       connect with a network-attached storage device (NAS) over a network;
       receive a request for updated drive compatibility information from the NAS over the network, the request sent by the NAS in response to connection of a data storage drive to the NAS;
       access the drive compatibility information stored in the one or more data storage devices; and
       send the updated drive compatibility information to the NAS over the network in response to the request, the updated drive compatibility information indicating whether the data storage drive is compatible with the NAS.

15. The computing system of claim 14, wherein the network is the Internet.

16. The computing system of claim 14, wherein the request for updated drive compatibility information includes version identification information associated with local drive compatibility information maintained by the NAS.

17. The computing system of claim 14, wherein the application server is further configured to:

determine whether the data storage drive connected to the NAS is compatible with the NAS based at least in part on the updated drive compatibility information; and provide a compatibility indication to the NAS over the network indicating whether the data storage drive is compatible with the NAS.

18. A method of managing data storage in a network-attached storage device (NAS), the method comprising:

storing local drive compatibility information in non-volatile memory of a NAS, the drive compatibility information indicating compatibility between the NAS and one or more data storage drives;

detecting a connection of a data storage drive to the NAS over a connection interface; and in response to said detecting:

obtaining updated drive compatibility information from a remote server over a network, updating the local drive compatibility information based on the updated drive compatibility information, determining whether the data storage drive is compatible with the NAS based at least in part on the updated drive compatibility information, and when the data storage drive is compatible with the NAS, sending user data to the data storage drive using the connection interface, wherein the data storage drive receives and stores the sent user data;

wherein the method is performed at least in part by a controller of the NAS.

19. The method of claim 18, further comprising sending a request for updated drive-compatibility information to the remote server over the network in response to boot-up of the NAS.

20. The method of claim 18, further comprising sending a request for updated drive-compatibility information to the remote server over the network in response to said detecting the connection of the data storage drive to the NAS.

21. The method of claim 18, further comprising sending a request for updated drive-compatibility information to the remote server over the network at periodic intervals.

22. The method of claim 18, further comprising:

determining that the NAS is not connected to the network; and in response to said determination, determining whether the data storage drive is compatible with the NAS based at least in part on the local drive compatibility information stored in the non-volatile memory.

23. The method of claim 18, further comprising providing a user notification indicating that the data storage drive is not compatible with the NAS when the data storage drive is determined to not be compatible with the NAS.

24. A network-attached storage device (NAS) comprising:

a data storage drive connection interface; and a controller configured to:

detect a connection of a data storage drive to the NAS over the connection interface, and in response to said detection:

send drive identification information associated with the data storage drive to a remote server over a network, receive a compatibility indication from the remote server over the network indicating whether the data storage drive is compatible with the NAS, and when the compatibility indication indicates that the data storage drive is compatible with the NAS, send user data to the data storage drive using the connection interface, wherein the data storage drive receives and stores the sent user data.

25. The NAS of claim 24, wherein the controller is further configured to maintain local drive-compatibility information in a non-volatile memory module of the NAS, the drive-compatibility information indicating compatibility between the NAS and data storage drives.

* * * * *